(12) United States Patent
Arai et al.

(10) Patent No.: US 9,194,510 B2
(45) Date of Patent: Nov. 24, 2015

(54) COMPOSITE VALVE

(75) Inventors: Yusuke Arai, Tokyo (JP); Takeshi Kannoo, Tokyo (JP); Masashi Yamashita, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 664 days.

(21) Appl. No.: 13/423,490

(22) Filed: Mar. 19, 2012

(65) Prior Publication Data

US 2012/0241024 A1 Sep. 27, 2012

(30) Foreign Application Priority Data

Mar. 25, 2011 (JP) .................. 2011-068451

(51) Int. Cl.
*F16K 31/40* (2006.01)
*F25B 41/06* (2006.01)

(52) U.S. Cl.
CPC ............ *F16K 31/406* (2013.01); *F25B 41/062* (2013.01); *Y02B 30/72* (2013.01); *Y10T 137/777* (2015.04); *Y10T 137/7761* (2015.04)

(58) Field of Classification Search
CPC ............ F16K 31/1221; F16K 31/1223; F16K 31/1226; F16K 31/1245; F16K 39/026; F16K 31/406; F16K 31/04; Y10T 137/7764; Y10T 137/7766; Y10T 137/777; Y10T 137/7761; F25B 41/062; F25B 2341/065; F25B 2341/0671; Y02B 30/72; F15B 13/043; F15B 13/0431; F15B 13/0433
USPC ......... 137/489, 491, 492.5, 487.5; 251/30.01, 251/30.02, 30.03, 33, 41, 43
See application file for complete search history.

(56) References Cited

U.S. PATENT DOCUMENTS

| 2,317,639 | A | | 4/1943 | William |
| 3,477,466 | A | * | 11/1969 | Sturm ................. 137/601.13 |
| 4,172,466 | A | | 10/1979 | Pattarini |
| 4,201,362 | A | | 5/1980 | Nishimi et al. |
| 4,300,586 | A | * | 11/1981 | Thuries et al. ............. 137/110 |
| 4,503,887 | A | * | 3/1985 | Johnson et al. ......... 137/624.13 |
| 4,615,354 | A | | 10/1986 | Bianchi |
| 5,417,402 | A | | 5/1995 | Speybroeck |
| 6,035,653 | A | | 3/2000 | Itoh et al. |
| 2004/0036044 | A1 | | 2/2004 | Hirota |
| 2004/0200530 | A1 | | 10/2004 | Dalton et al. |
| 2013/0167949 | A1 | | 7/2013 | Arai |

FOREIGN PATENT DOCUMENTS

| JP | 3799732 B2 | 7/2006 |
| JP | 4416528 B2 | 2/2010 |

* cited by examiner

*Primary Examiner* — William McCalister
*Assistant Examiner* — Michael R Reid
(74) *Attorney, Agent, or Firm* — Bacon & Thomas, PLLC

(57) ABSTRACT

In the case that a lift amount of a second valve body for controlling a small flow rate is equal to or less than a predetermined amount, a pilot passage is closed by a pilot valve body, and a first valve port is closed by a first valve body for controlling a large flow rate, thereby taking a small flow rate control state in which a flow rate is controlled in correspondence to the lift amount of the second valve body, and in the case that the lift amount of the second valve body goes beyond the predetermined amount, the pilot valve body is moved up in conjunction with an upward movement of a valve shaft so as to open the pilot passage, thereby taking a large flow rate control state in which the first valve body opens the first valve port on the basis of this.

13 Claims, 8 Drawing Sheets

COMPOSITE VALVE

BACKGROUND OF THE INVENTION

1. Field of the Invention

The present invention relates to a composite valve which is preferably used in a heat pump type cooling and heating system or the like, and more particularly to a composite valve which is provided with a pilot type large flow rate control valve and a small flow rate control valve.

2. Description of the Conventional Art

As a heat pump type cooling and heating system, there has been conventionally known a structure which is provided with a compressor, a condenser, an evaporator, an expansion valve and a four-way valve for inverting a refrigerant flow path.

On the other hand, as a heat pump type cooling and heating system for a vehicle (for example, for an electric vehicle), there has been proposed a system which does not invert a flow of a refrigerant and is provided independently with an expansion valve for cooling and an expansion valve for heating, for example, as shown in FIG. 1 of Japanese Official Gazette of Patent No. 3799732.

The flow of the refrigerant is not inverted in the system mentioned above. Accordingly, for example, paying attention to an expansion valve for heating (reference numeral 24 in the document) shown in FIG. 1 of the document, there is provided such a system that an electromagnetic valve for cooling (reference numeral 26 in the document) is provided in parallel in the expansion valve for heating, a heating operation is carried out by closing the electromagnetic valve for cooling and narrowing down the refrigerant by means of the expansion valve for heating at a time of heating, and the expansion valve does not carry out the narrowing down of the refrigerant by setting the electromagnetic valve for cooling open and bypassing the inlet and outlet of the expansion valve for heating at a time of cooling.

In the meantime, if the expansion valve and the electromagnetic valve for bypassing are respectively provided, the system is enlarged in size, and there is a risk that an electric power consumption is enlarged.

Accordingly, it is thought to achieve these functions by one electrically operated valve. In other words, for example, the refrigerant may be narrowed down by the electrically operated valve at a time of heating, and the electrically operated valve may be fully opened at a time of cooling.

In this case, a description will be given of one example of a conventional electrically operated valve with reference to FIG. 8.

An electrically operated valve 1' in an illustrated example is provided with a valve shaft 25 which has a lower large diameter portion 25a and an upper small diameter portion 25b, a valve main body 40 which has a valve chamber 41, a can 60 which is bonded in a sealing manner to the valve main body 40 in its lower end portion, a rotor 30 which is arranged in an inner periphery of the can 60 so as to be spaced at a predetermined gap a, and a stator 50A which is outward fitted to the can 60 so as to rotationally drive the rotor 30.

The valve shaft 25 is integrally provided with a valve body portion 44 having a specific shape (two stages of inverted circular truncated cone shapes respectively having predetermined angles of center) in a lower end portion of the lower large diameter portion 25a, and the present electrically operated valve 1' is structured such that a passing flow rate of the refrigerant is controlled by changing a lift amount of the valve body portion 44.

The valve chamber 41 of the valve main body 40 is provided in its lower portion with a valve seat 42 with a valve port (an orifice) 43 which the valve body portion 44 comes close to and away from, and is opened in its side portion to a first inlet and outlet 5', and a lower portion of the valve main body 40 is provided with a second inlet and outlet 6' so as to be connected to the valve port 43.

The stator 50A is constructed by a yoke 51, a bobbin 52, a stator coil 53, a resin mold cover 56 and the like, a stepping motor 50 is constructed by the rotor 30, the stator 50A and the like, and an elevation driving mechanism for regulating a lift amount (=an opening degree) of the valve body portion 44 with respect to the valve port 43 is constructed by the stepping motor 50, a feed screw (a female thread portion 38 and a male thread portion 48) mentioned below and the like.

A support ring 36 is integrally connected to the rotor 30, and an upper protruding portion of a lower opened and tubular valve shaft holder 32 which is arranged in an outer periphery of a guide bush 46 is fixed, for example, by caulking to the support ring 36, whereby the rotor 30, the support ring 36 and the valve shaft holder 32 are integrally connected.

Further, a lower end portion of the tubular guide bush 46 is pressed into and fixed to a fitting hole 49 provided in an upper portion of the valve main body 40, and (the lower large diameter portion 25a of) the valve shaft 25 is inward inserted slidably to the guide bush 46. Further, in order to move up and down the valve shaft 25 (the valve body portion 44) by utilizing a rotation of the rotor 30, the male thread portion 48 is formed in an outer periphery of the guide bush 46, the female thread portion 38 is formed in an inner periphery of the valve shaft holder 32, and the feed screw is constructed by the male thread portion 48 and the female thread portion 38.

Further, an upper small diameter portion 46b of the guide bush 46 is inward inserted to an upper portion of the valve shaft holder 32, and the upper small diameter portion 25b of the valve shaft 25 is inserted to (a through hole formed in) the center of a ceiling portion of the valve shaft holder 32. A push nut 33 is pressed into and fixed to an upper end portion of the upper small diameter portion 25b of the valve shaft 25.

Further, the valve shaft 25 is outward inserted to the upper small diameter portion 25b of the valve shaft 25, and is normally energized downward (in a valve closing direction) by a valve closing spring 34 constructed by a compression coil spring which is installed in a compression manner between a ceiling portion of the valve shaft holder 32 and an upper end terrace surface of the lower large diameter portion 25a in the valve shaft 25. A restoring spring 35 constructed by a coil spring is provided in an outer periphery of the push nut 33 on the ceiling portion of the valve shaft holder 32, the coil spring being provided for returning in the case that the valve shaft 25 moves in the valve opening direction and an engagement between the female thread portion 38 and the male thread portion 48 is disconnected.

To the guide bush 46, there is firmly fixed a lower stopper body (a fixing stopper) 47 which constructs one of rotation and downward movement stopper mechanisms for inhibiting a further rotation and downward movement at a time when the rotor 30 is rotated and moved downward to a predetermined valve closing position, and to the valve shaft holder 32, there is firmly fixed an upper stopper body (a movable stopper) 37 which constructs another of the stopper mechanisms.

In this case, the valve closing spring 34 is arranged for obtaining a desired seal pressure in a valve closed state in which the valve body portion 44 seats on the valve port 43 (preventing a leakage), and for reducing an impact at a time when the valve body portion 44 comes into contact with the valve port 43.

In the electrically operated valve 1' structured as mentioned above, the rotor 30 and the valve shaft holder 32 are rotated in one direction with respect to the guide bush 46 which is fixed to the valve main body 40, by supplying an electrifying and exciting pulse to the motor 50 (the stator 50A) in accordance with a first mode, and on the basis of a screw feeding of the thread portions 48 and 38, for example, the valve shaft holder 32 moved downward, the valve body portion 44 is pressed to the valve seat 42, and the valve port 43a is closed.

At a time point when the valve port 43 is closed, the upper stopper body 37 has not come into contact with the lower stopper body 47 yet, and the rotor 30 and the valve shaft holder 32 further rotate and move downward while the valve body portion 44 closes the valve port 43. In this case, since the valve shaft 25 (the valve body portion 44) does not move downward, however, the valve shaft holder 32 moves downward, the valve closing spring 34 is compressed at a predetermined amount. As a result, the valve body portion 44 is strongly pressed to the valve seat 43, the upper stopper body 37 comes into contact with the lower stopper body 47 on the basis of the rotation and the downward movement of the valve shaft holder 32, and the rotation and the downward movement of the valve shaft holder 32 are forcibly stopped even if the pulse supply with respect to the stator 50A is thereafter carried on.

On the other hand, if the electrifying and exciting pulse is supplied in accordance with a second mode to the stator 50A from this fully closed state, the rotor 30 and the valve shaft holder 32 are rotated in a reverse direction to that mentioned above with respect to the guide bush 46 which is fixed to the valve main body 40, and the valve shaft holder 32 moves upward this time on the basis of the screw feeding of the thread portions 48 and 38. In this case, since the valve closing spring 34 is compressed at the predetermined amount as mentioned above, at a time point of starting the rotation and the upward movement of the valve shaft holder 32 (a time point of starting the pulse supply), the valve body portion 44 is not disconnected from the valve seat 42 and remains in the valve closed state (a lift amount=0) until the valve closing spring 34 extends at the predetermined amount mentioned above. Further, if the valve shaft holder 32 is further rotated and moved upward after the valve closing spring 34 extends at the predetermined amount, the valve body portion 44 is disconnected from the valve seat 42 and the valve port 43 is opened, so that the refrigerant passes through the valve port 43.

In this case, it is possible to optionally and finely regulate the lift amount of the valve body portion 44, in other words, an effective opening area (=an opening degree) of the valve port 43 on the basis of an amount of rotation of the rotor 30. Further, since the amount of rotation of the rotor 30 is controlled by a supply pulse number, it is possible to control a flow rate of the refrigerant at a high precision.

Accordingly, in the case that the electrically operated valve 1' having the structure mentioned above is employed as the electrically operated valve having both functions of the expansion valve and the bypass valve as shown in the Japanese Patent No. 3799732, it is set to a maximum opening degree (a maximum lift amount) in such a manner as to reduce the pressure loss as much as possible so as to achieve the function of the bypass valve, for example, at a time of the cooling operation, and it is set such as to finely control the opening degree (the lift amount) so as to achieve the function of the expansion valve and finely control the valve opening degree, that is, the flow rate of the refrigerant, for example, at a time of the heating operation.

However, in order to make the electrically operated valve 1' serve as the bypass valve, it is necessary to minimize the pressure loss. In this case, it is necessary to make a valve bore diameter equal to or more than a piping diameter of the heat pump type cooling and heating cycle. For example, on the assumption that the piping diameter is 10 mm, the valve bore diameter equal to or more than it is necessary.

As a result, since a great toque is required in an actuator for driving, the electrically operated valve is enlarged in size and an electric power consumption becomes large.

On the other hand, in order make the electrically operated valve 1' serve as the expansion valve, it is necessary to enhance a resolving power of the flow rate control, however, in this case, it takes long time to reach a full open state (a flow path bypass state) from a micro flow rate control state at a time of the heating operation, and an opening gap (a gap between the valve body portion and the valve port) at a time of the small flow rate control becomes very narrow, so that there is a risk that a foreign material or the like is bitten into the gap.

Accordingly, in order to achieve both an improvement of a flow rate control precision and an increase of a controllable flow rate (a reduction of the pressure loss) at a time of the small flow rate, and achieve a reduction of a time from the time of the small flow rate to the maximum opening degree, the following Japanese Official Gazette of Patent No. 4416528 discloses a provision of a pilot type first control valve (a first valve body and a first valve port) for a large flow rate and a second control valve (a second valve body and a second valve port) for a small flow rate, in more detail, a composite valve structured such as to open and close the first valve port having a large bore diameter by the piston type first valve body, open and close the second valve port having a small bore diameter by the needle type second valve body which is an independent body from the first valve body and is provided in the lower portion of the valve shaft, and make the second control valve for the small flow rate serve as the pilot valve of the first control valve for the large flow rate.

In this composite valve, when the lift amount of the valve shaft (the second valve body) is equal to or less than a predetermined amount (when the second control valve opening degree is equal to or less than a predetermined value), there is established a small flow rate control state in which the first valve body closes the first valve port, and the second control valve opening degree for the small flow rate is controlled by the second valve body. At this time, the refrigerant at an amount corresponding to the lift amount (the second control valve opening degree) of the second valve body flows to the inflow port→the first valve chamber→the gap of the sliding surface formed between the outer peripheral surface of the first valve body and the wall surface of the first valve chamber→the back pressure chamber→the pilot passage→the second valve chamber→the second valve port→the outflow passage→the outflow port. Further, if the lift amount of the valve shaft (the second valve body) goes beyond the predetermined amount, the amount of the refrigerant flowing out of the back pressure chamber via the second valve port is increased in comparison with the small flow rate control time, the pressure of the back pressure chamber is lowered, and the valve opening force becomes finally larger than the valve closing force acting on the first valve body, whereby the first valve body opens the first valve port, and there is established a large flow rate control state in which the refrigerant flows to the inflow port→the first valve chamber→the first valve port→the outflow port.

As mentioned above, it is possible to achieve both the improvement of the flow rate control precision at a time of the small flow rate and the increase of the controllable flow rate (the reduction of the pressure loss), and the low electric power consumption, by opening and closing the first valve port having the large bore diameter by means of the first valve body, opening and closing the second valve port having the small bore diameter by means of the second valve body, and making the second valve body serve as the pilot valve of the first control valve for the large flow rate.

SUMMARY OF THE INVENTION

However, in the composite valve described in the Japanese Official Gazette of Patent No. 4416528 mentioned above, since the single second control valve for the small flow rate serves as the control valve for the small flow rate time and the pilot valve with respect to the first control valve for the large flow rate, there have been the following problems to be improved. In other words, since it is necessary to widely increase the flow rate of the refrigerant passing through the second control valve for the small flow rate in comparison with the small flow rate control time, in order to switch from the small flow rate control to the large flow rate control, it is necessary to set the bore diameter (the effective opening area) of the second valve port significantly larger than the bore diameter which is necessary for the small flow rate control. Accordingly, an increase of a motion load, and an enlargement in size of a driving portion (a motor portion) and a valve main body tend to be caused, and a dimensional and a shape of the second control valve for the small flow rate can not be limited to those which are optimum for the small flow rate control, so that there is such a problem that a flow rate control precision at a time of the small flow rate control can not be enhanced very much.

Further, since the opening and closing of the first control valve for the large flow rate depends on the lift amount of the second valve body changing subtly, there is not a little a case that the opening and closing of the first control valve for the large flow rate is not carried out at a desired timing. Further, since the refrigerant is circulated via the sliding surface gap of the first valve body→the back pressure chamber→the pilot passage at a time of the small flow rate control, there is such a problem that a malfunction caused by a small foreign material mixing into the refrigerant (for example, the locking of the first valve body caused by the biting of the small foreign material into the sliding surface gap) tends to be generated.

The present invention is made by taking the circumstance mentioned above into consideration, and an object of the present invention is to provide a composite valve which is provided with a pilot type first control valve for a large flow rate and a second control valve for a small flow rate, can set a dimension and a shape of the second control valve for the small flow rate to optimum ones for the small flow rate control, can securely carry out an opening and closing of the first control valve for the large flow rate at a desired timing, and is hard to generate a malfunction, in order to achieve both an improvement of a flow rate control precision at a time of the small flow rate and an increase of a controllable flow rate (a reduction of a pressure loss).

In order to achieve the object mentioned above, a composite valve in accordance with the present invention is basically comprising:

a piston type first valve body;

a valve shaft provided with a needle type second valve body;

an elevation driving means for moving up and down the valve shaft;

a pilot valve body for a first control valve for a large flow rate driven so as to be opened and closed by utilizing the elevating motion of the valve shaft; and a valve main body provided with an inflow port and an outflow port, wherein between the inflow port and the outflow port in the valve main body, there are provided a fitting and inserting chamber to which the first valve body is slidably fitted and inserted, and which is zoned into a back pressure chamber and a first valve chamber by the first valve body, a first valve port which is open to the first valve chamber, a second valve chamber in which the pilot valve body and the second valve body are arranged so as to be movable up and down, a second valve port which communicates the inflow port or the first valve chamber with the second valve chamber, and a pilot passage which communicates the back pressure chamber with the second valve chamber, and wherein in the case that a lift amount of the second valve body is equal to or less than a predetermined amount, the pilot passage is closed by the pilot valve body, and the first valve port is closed by the first valve body, thereby taking a small flow rate control state in which a flow rate is controlled in correspondence to the lift amount of the second valve body, and in the case that the lift amount of the second valve body goes beyond the predetermined amount, the pilot valve body is moved up in conjunction with the upward movement of the valve shaft so as to open the pilot passage, thereby taking a large flow rate control state in which the first valve body opens the first valve port on the basis of this.

In accordance with a preferable aspect, the pilot valve body is outward inserted so as to be slidable to an upper side than the second valve body in the valve shaft, is energized downward by a spring member so as to close the pilot passage, and is structured such as to be pulled up against an energizing force of the spring member by a catch portion provided in the valve shaft if the lift amount of the second valve body is further increased from the predetermined amount.

In accordance with the other preferable aspect, the first valve body is provided with a pressure equalizing hole which communicates the first valve chamber with the back pressure chamber.

In accordance with the other preferable aspect, the first valve body and the second valve body are both arranged in a vertical direction and are separated from each other at a predetermined distance in a transverse direction.

In accordance with the other preferable aspect, the first valve body is arranged transversally and the second valve body is arranged vertically.

In accordance with the other preferable aspect, the valve shaft, the second valve body and the first valve body are arranged on the same axis.

Since the composite valve in accordance with the present invention is provided with the pilot valve which is independent from the second valve body, in addition to the first control valve for the large flow rate (the first valve body and the first valve port), and the second control valve for the small flow rate (the second valve body and the second valve port), and is structured such as to drive the pilot valve body so as to open and close by utilizing the elevating motion of the valve shaft, it is possible to set the dimension and the shape of the second control valve for the small flow rate (the second valve body and the second valve port) so as to be optimum for the small flow rate control, and it is possible to securely carry out the opening and closing of the first control valve for the large flow rate at a desired timing. Further, since the structure is made such as to circulate the refrigerant without passing through the narrow portion such as the sliding surface gap or the like as is different from the conventional one, at a time of controlling the small flow rate, it is possible to make the malfunction hard to be generated. As a result, it is possible to achieve both an improvement of the flow rate control precision at a time of the small flow rate, and an increase of the controllable flow rate (a reduction of the pressure loss), without causing an increase of a motion load, and an enlargement in size of the driving portion (the motor portion) and the valve main body.

DETAILED DESCRIPTION OF PREFERRED EMBODIMENT

Figure 1:
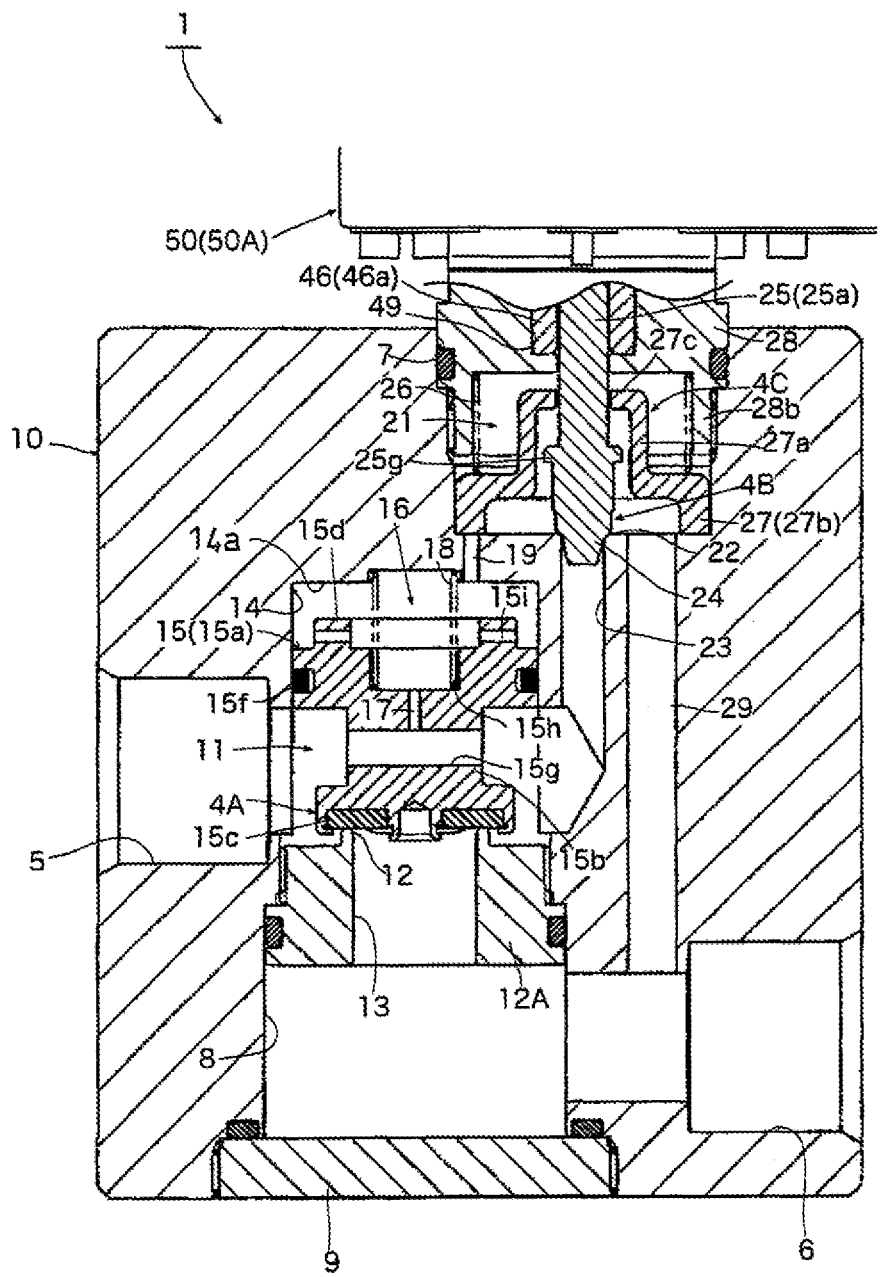
FIG. 1 is a vertical cross sectional view of a substantial part and shows a first motion state (a fully closed state) in a first embodiment of a composite valve in accordance with the present invention.

A description will be given below of embodiments in accordance with the present invention with reference to the accompanying drawings.

FIG. 1 to FIG. 4 are enlarged cross sectional views of a substantial part and show a first embodiment of a composite valve in accordance with the present invention, and the respective drawings show different motion states. Since a stepping motor 50 portion of a composite valve 1 in accordance with an illustrated embodiment is approximately the same as the conventional electrically operated valve 1' shown in FIG. 8, the portion is omitted.

The composite valve 1 in accordance with the illustrated first embodiment is provided with a rectangular parallelepiped valve main body 10, a pilot type first control valve 4A (a first valve body 15 and a first valve port 13) for a large flow rate, a second control valve 4B (a second valve body 24 and a second valve port 23) for a small flow rate, and a pilot valve 4C (a pilot valve body 27 and a pilot passage 19) with respect to the first control valve 4A for the large flow rate, for achieving both of an improvement of a flow rate control precision at a time of a small flow rate and an increase of a controllable flow rate (a reduction of a pressure loss), and the first control valve 4A for the large flow rate and the second control valve 4B for the small flow rate are both arranged vertically, and are separated from each other at a predetermined distance in a transverse direction.

In more detail, the valve main body 10 is structured such that an inflow port 5 is provided in the vicinity of the center in one side, an outflow port 6 is provided in a lower portion in another side, a stepped concave hole 7 which is open in its upper surface is provided slightly closer to a right side in an upper portion, and a stepped downward vertical hole 8 which is open in its lower surface is provided in a right adjacent to the inflow port 5 in a lower side of the concave hole 7.

Figure 8:
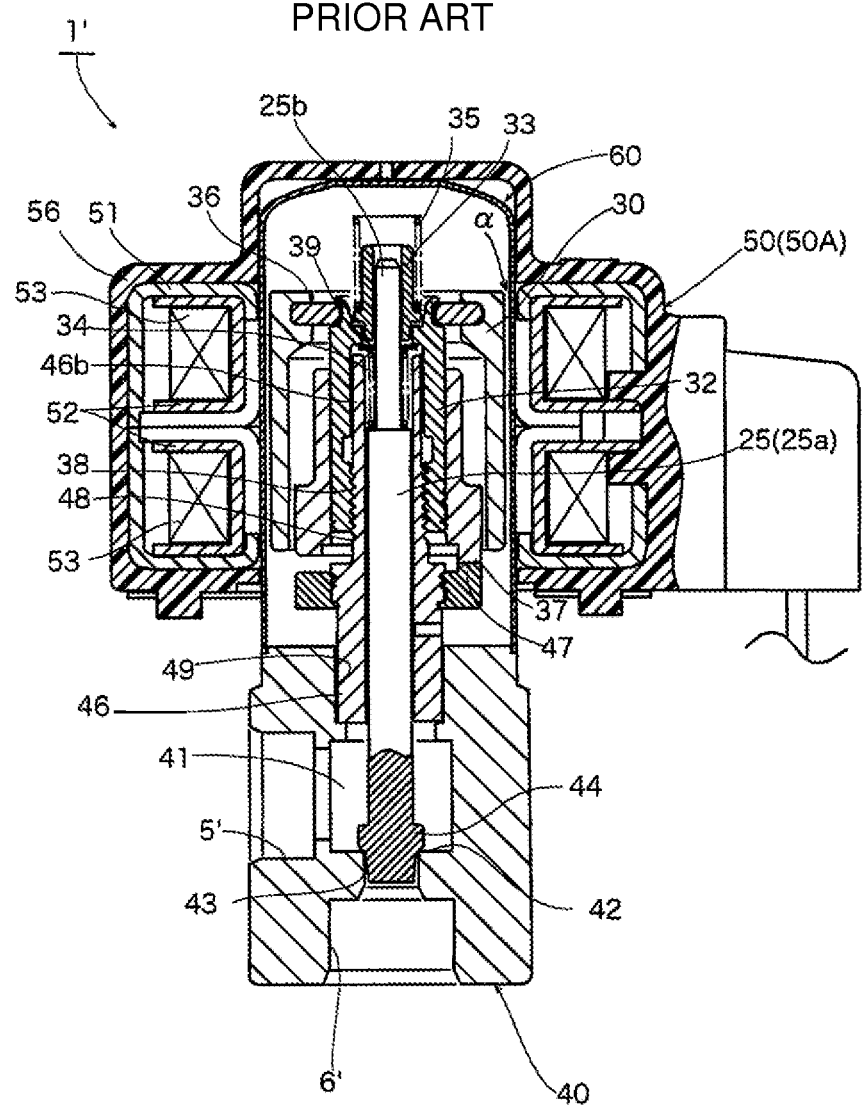
FIG. 8 is a vertical cross sectional view showing an example of a conventional electrically operated valve.

A bush retention body 28 corresponding to an upper portion of the valve main body 40 in the conventional electrically operated valve 1' shown in FIG. 8 is fixed to an upper half portion of the stepped concave hole 7, for example, by a screwing, a second valve chamber 21 is defined in a lower side than a cylinder portion 28b with ceiling surface which is provided in a lower half portion of the bush retention body 28 in the concave hole 7, and the center of a bottom portion of the concave hole 7 is provided with a second valve seat 22 with a second valve port 23 which a second valve body 24 provided in a lower portion of a valve shaft 25 which is driven so as to move up and down by the motor 50 comes close to and away from and which has a small bore diameter. The second valve port 23 is provided so as to extend in a vertical direction, and is combined its lower portion with a first valve chamber 11 mentioned below. Further, an upper end of an outflow passage 29 which communicates the second valve chamber 21 with the outflow port 6 is opened to the bottom portion of the concave hole 7.

Further, (an upper side portion 27c of) a pilot valve body 27 which has a small diameter cylinder portion 27a and a large diameter cylinder portion 27b and is open in its lower surface is outward inserted slidably to an upper side than the second valve body 24 in the valve shaft 25. The pilot valve body 27 is structured such as to open and close a pilot passage 19 which communicates the downward vertical hole 8 (a back pressure chamber 16 mentioned below) with the second valve chamber 21, on the basis of an annular lower end surface of the large diameter cylinder portion 27 in order to move a first valve body 15 mentioned below in an opening and closing direction, is energized downward by a pilot valve closing spring 26 constructed by a compression coil spring which is installed in a compressed manner between a ceiling surface of a cylinder portion 28b of the bush retention body 28 and the large diameter cylinder portion 27b, and is structured such as to open the pilot passage 19 by being pulled against an energizing force of the pilot valve closing spring 26 by means of a collar shaped catch portion 25g which is provided in the valve shaft 25, if a lift amount of the valve shaft 25 goes beyond a predetermined amount Tc. In other words, the pilot valve body 27 is structured such as to be opened and closed by utilizing an elevating motion of the valve shaft 25.

A valve seat member 12A having a valve seat 12 with a large bore diameter first valve port 13 is fixed to a slightly lower side of the inflow port 5 in the stepped downward vertical hole 8 in accordance with a screwing or the other appropriate method. Further, a lower portion of the downward vertical hole 8 is open to the outflow port 6, and a lower end portion thereof is occluded by a blank cap 9.

An upper side than the valve seat member 12A in the downward vertical hole 8 is formed as a fitting and inserting chamber 14 with a ceiling surface 14a to which (a large diameter portion 15a of) a piston type first valve body 15 is slidably fitted and inserted, the back pressure chamber 16 is defined in an upper side than (the large diameter portion 15a of) the first valve body 15 in the fitting and inserting chamber 14, and the first valve chamber 11 is defined in a lower side than (the large diameter portion 15a of) the first valve body 15.

The first valve body 15 has a bobbin-like outer shape in cross section having the large diameter portion 15a and the small diameter portion 15b, an annular seal member 15c which comes close to and away from the first control valve seat 12 for the large flow rate so as to open and close the first valve port 13, and is made of a rubber or a Teflon (trade mark) or the like is fixed to a lower end portion thereof in accordance with an appropriate method such as a caulking or the like, an upper end surface portion thereof is provided in a protruding manner with a stopper 15d with a transverse hole 15i which comes into contact with the ceiling surface of the fitting and inserting chamber 14 so as to define an upward moving limit of the first valve body 15, and a seal member (a piston ring) 15f is installed to an outer periphery of the large diameter portion 15a.

Further, a first valve closing spring 18 constructed by a compression coil spring is installed in a compression manner between a bottom surface of a spring bearing hole 15h which is provided in the center of an upper portion of the first valve body 15 and the ceiling surface 14a of the fitting and inserting chamber 14, in order to energize the first valve body 15 downward (in a valve closing direction).

Further, a transverse penetrating passage 15g is provided in the small diameter portion 15b of the first valve body 15, and a center portion thereof is provided with a pressure equalizing hole 17 for communicating the first valve chamber 11 with the back pressure chamber 16 via the transverse penetrating passage 15g.

In this case, the transverse penetrating passage 15g is not always necessary (is effective in the case that the first valve chamber 11 is narrow), but the pressure equalizing hole 17 may be provided, for example, in such a manner as to be open to the side surface of the small diameter portion 15b and the spring bearing hole 15h, thereby directly communicating the first valve chamber 11 with the back pressure chamber 16.

In this case, in the composite valve 1 in accordance with the present embodiment, on the assumption that a pressure of the first valve chamber 11 is set to P1, a pressure of the back pressure chamber 16 is set to P2, a pressure of the first valve port 13 is set to P3, a horizontal cross sectional area of the back pressure chamber 16 (a pressure bearing area of the first valve body 15) is set to Ap, a horizontal cross sectional area of the first valve port 13 is set to Av, an energizing force of the first valve opening spring 18 is set to Pf, a force pushing up the first valve body 15 is set to a vale opening force, and a force pushing down the first valve body 15 is set to a valve closing force, a valve opening condition of the first control valve for the large flow rate is as follows.

Valve closing force=$P2 \times Ap + Pf$<valve opening force=$P1 \times (Ap-Av) + P3 \times Av$ In the composite valve 1 structured as mentioned above, since the high pressure refrigerant which is introduced into the first valve chamber 11 from the inflow port 5 is introduced into the back pressure chamber 16 via the transverse penetrating passage 15g and the pressure equalizing hole 17, and the pressure of the back pressure chamber 16 becomes a high pressure, in the case that the first valve body 15, the second valve body 24 and the pilot valve body 27 are all in the closed state, as shown in FIG. 1, the first valve body 15 is strongly pressed to the first valve seat 12.

Figure 2:
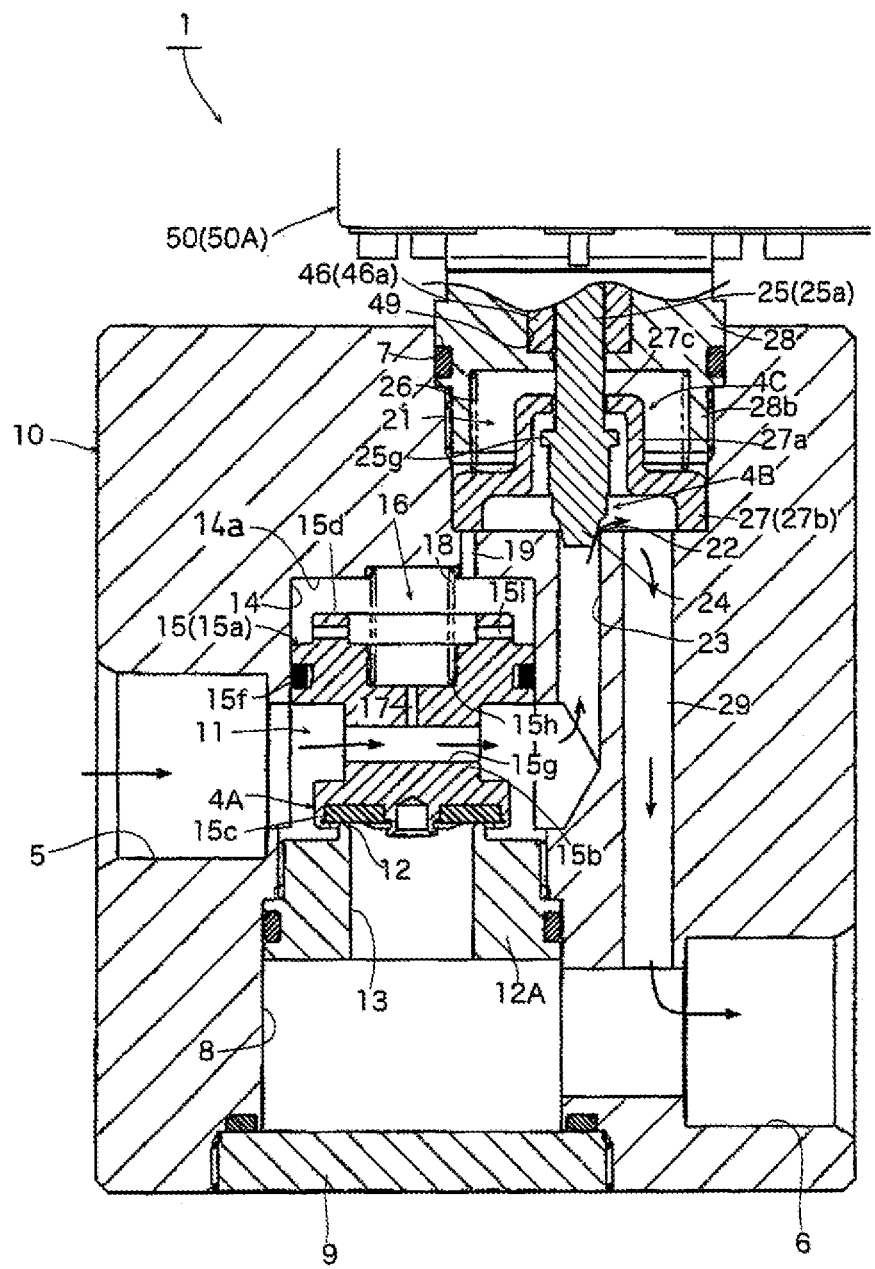
FIG. 2 is a vertical cross sectional view of a substantial part and shows a second motion state (a small flow rate control state) in the first embodiment of the composite valve in accordance with the present invention.
Figure 3:
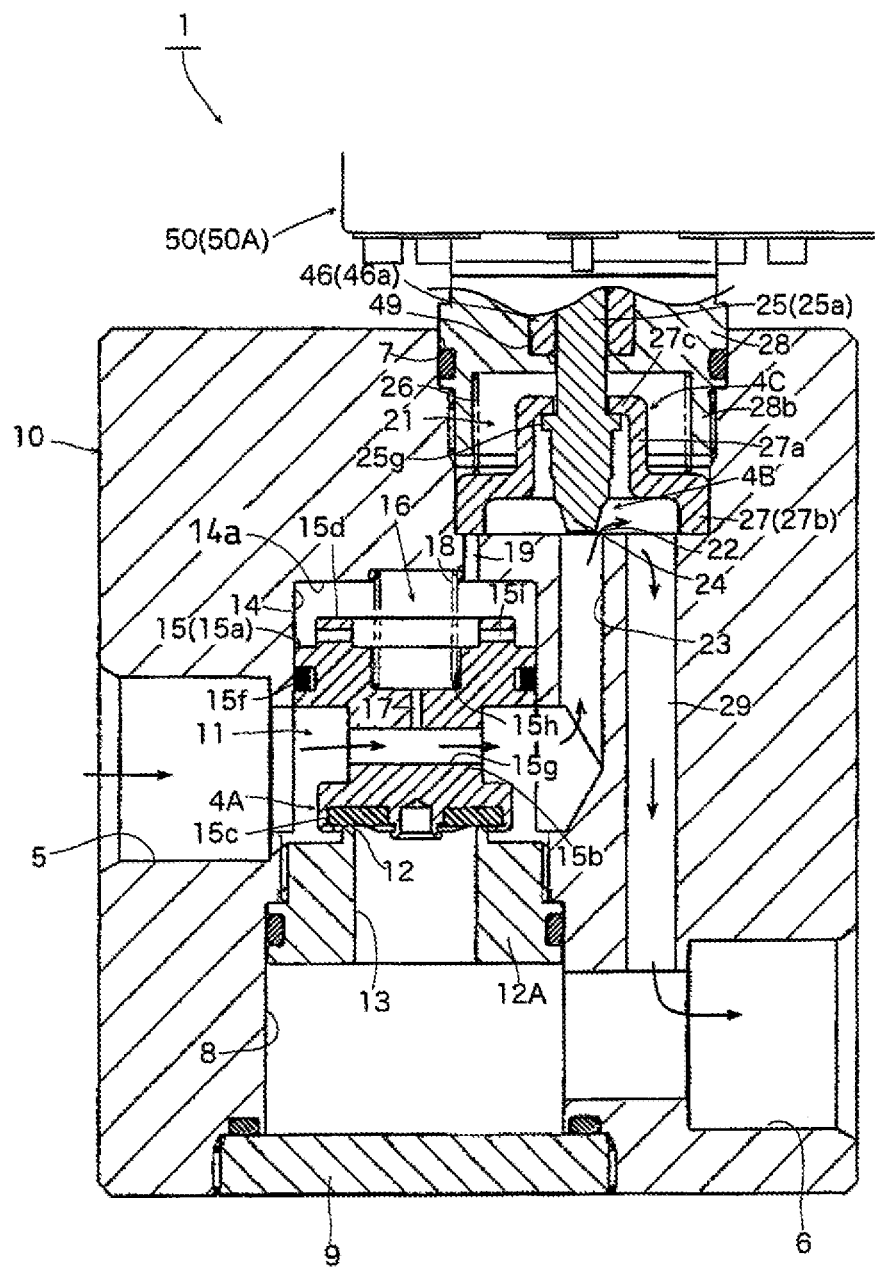
FIG. 3 is a vertical cross sectional view of a substantial part and shows a third motion state (a state just before switching from the small flow rate control to a large flow rate control) in the first embodiment of the composite valve in accordance with the present invention.

If the valve shaft 25, that is, the second valve body 24 is moved up by carrying out a pulse supply to the motor 50 from this state, the second valve port 23 is opened as shown in FIG. 2 and FIG. 3. In this case, in the case that a lift amount of the second valve body 24 is equal to or less than a predetermined amount Tc, the pilot passage 19 is closed by the pilot valve body 27, and the first valve port 13 is closed by the first valve body 15, thereby coming to a small flow rate control state in which the flow rate of the refrigerant (the opening degree of the second control valve) is controlled in correspondence to a lift amount of the second valve body 24. In this small flow rate control state, the refrigerant at a corresponding amount to the lift amount of the second valve body 24 flows to the inflow port 5→the first valve chamber 11→the second valve port 23→the second valve chamber 21 (the inner side of the pilot valve 4C)→the outflow passage 29→the outflow port 6.

Figure 4:
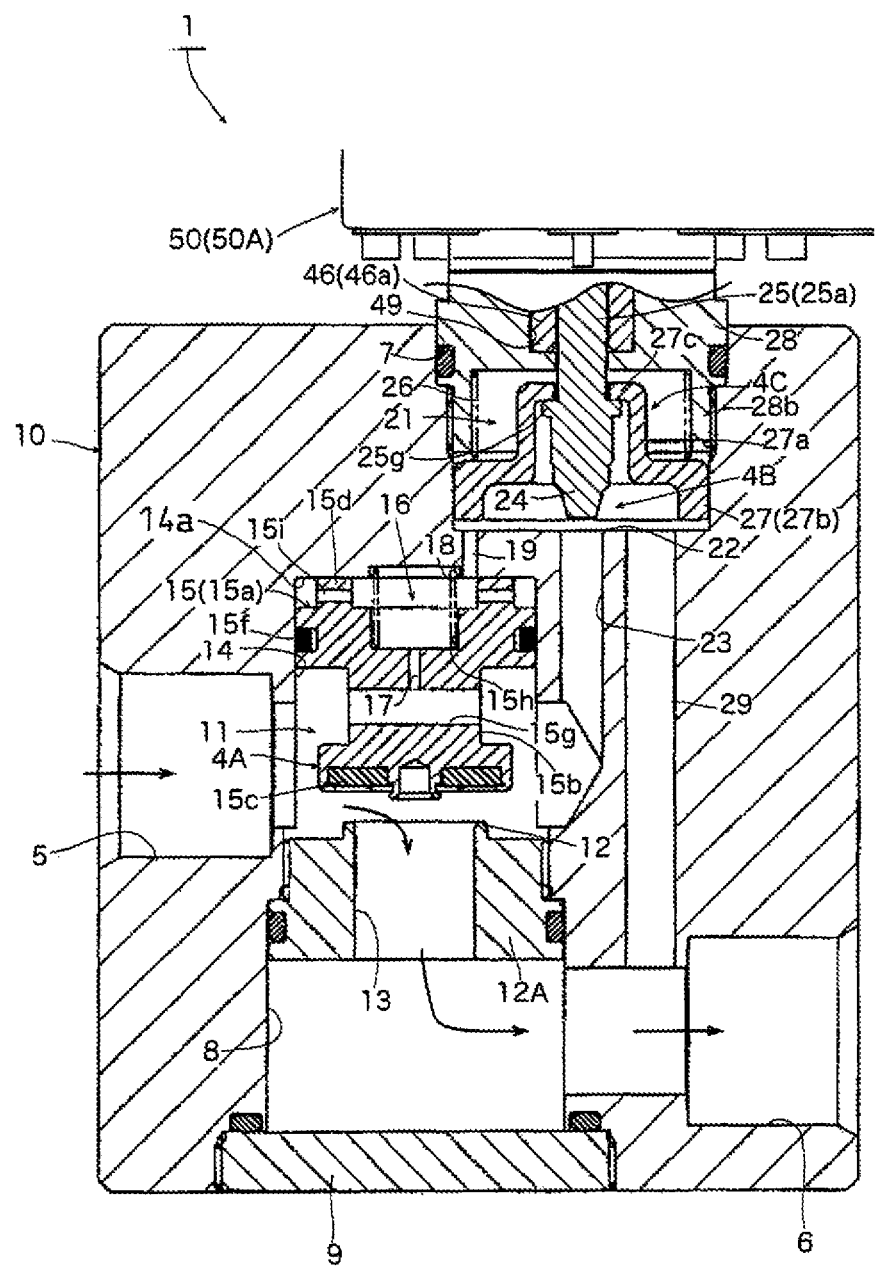
FIG. 4 is a vertical cross sectional view of a substantial part and shows a fourth motion state (a large flow rate control state) in the first embodiment of the composite valve in accordance with the present invention.

Further, if the lift amount of the second valve body 24 goes beyond the predetermined amount Tc, the pilot valve body 27 is pulled up against the energizing force of the valve closing spring 26 by the collar shaped catch portion 25g which is provided in the valve shaft 25, as shown in FIG. 4, whereby the pilot passage 19 is opened, and the refrigerant is introduced into the second valve chamber 21 from the back pressure chamber 16 via the pilot passage 19, and is conducted to the outflow port 6 via the outflow passage 29 therefrom. In accordance with this, the pressure of the back pressure chamber 16 falls down, the valve opening force becomes finally larger than the valve closing force which acts on the first valve body 15, and the first valve body 15 opens the first valve port 13, thereby coming to the large flow rate control state in which the refrigerant flows to the inflow port 5→the first valve chamber 11→the first valve port 13→the outflow port 6.

As is understood from the description mentioned above, in the composite valve 1 in accordance with the present embodiment, since it is structured such as to be provided with the pilot valve body 27 which is independent from the second valve body 24, in addition to the first control valve 4A (the first valve body 15 and the first valve port 13) for the large flow rate, and the second control valve 4B (the second valve body 24 and the second valve port 23) for the small flow rate, and drive the pilot valve body 27 so as to open and close by utilizing the elevating motion of the valve shaft 25, it is possible to set the dimension and the shape of the second control valve 4B (the second valve body 24 and the second valve port 23) for the small flow rate to ones which are optimum for the small flow rate control, and it is possible to securely carry out the opening and closing of the first control valve 4A for the large flow rate at the desired timing. Further, since the refrigerant is structured such as to be circulated without being passed through the narrow portion such as the sliding surface gap or the like as is different from the conventional structure at a time of the small flow rate control, it is possible to make the malfunction hard be caused. As a result, it is possible to achieve both of an improvement of the flow rate control precision at a time of the small flow rate and an increase of the controllable flow rate (a reduction of the pressure loss) without causing an increase of the motion load and an enlargement in size of the driving portion (the motor portion) and the valve main body.

In this case, it goes without saying that the composite valve in accordance with the present invention is not limited to the structure of the composite valve 1 in accordance with the first embodiment mentioned above, but various modifications can be applied thereto.

For example, in the embodiment mentioned above, the description is given on the assumption that the pressure equalizing hole 17 is provided in the first valve body 15, for communicating the first valve chamber 11 with the back pressure chamber 16, however, the present invention is not limited to this, but may be structured such that a small gap is provided between the piston ring 15f which is provided in an outer periphery of the large diameter portion 15a of the first valve body 15, and the fitting and inserting chamber 14, and the refrigerant within the first valve chamber 11 is introduced into the back pressure chamber 16 via the gap.

Figure 5:
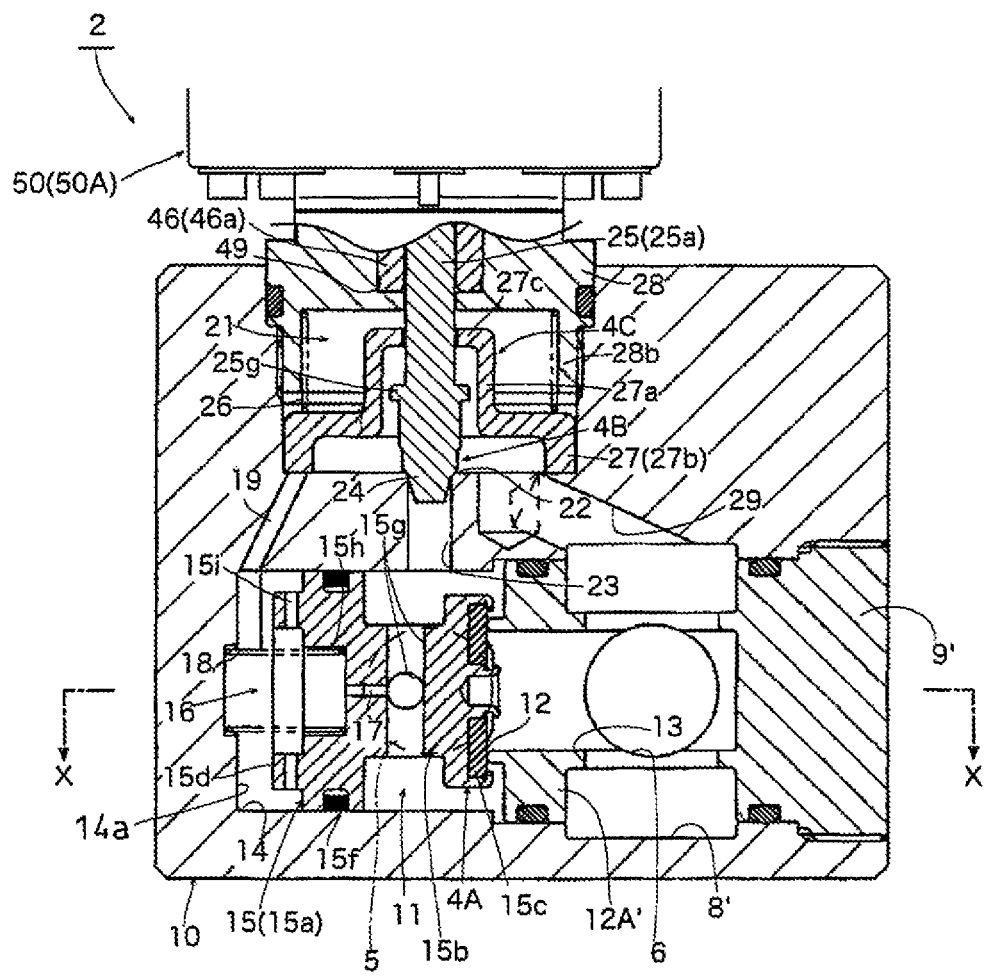
FIG. 5 is a vertical cross sectional view of a substantial part and shows a fully closed state in a second embodiment of the composite valve in accordance with the present invention.
Figure 6:
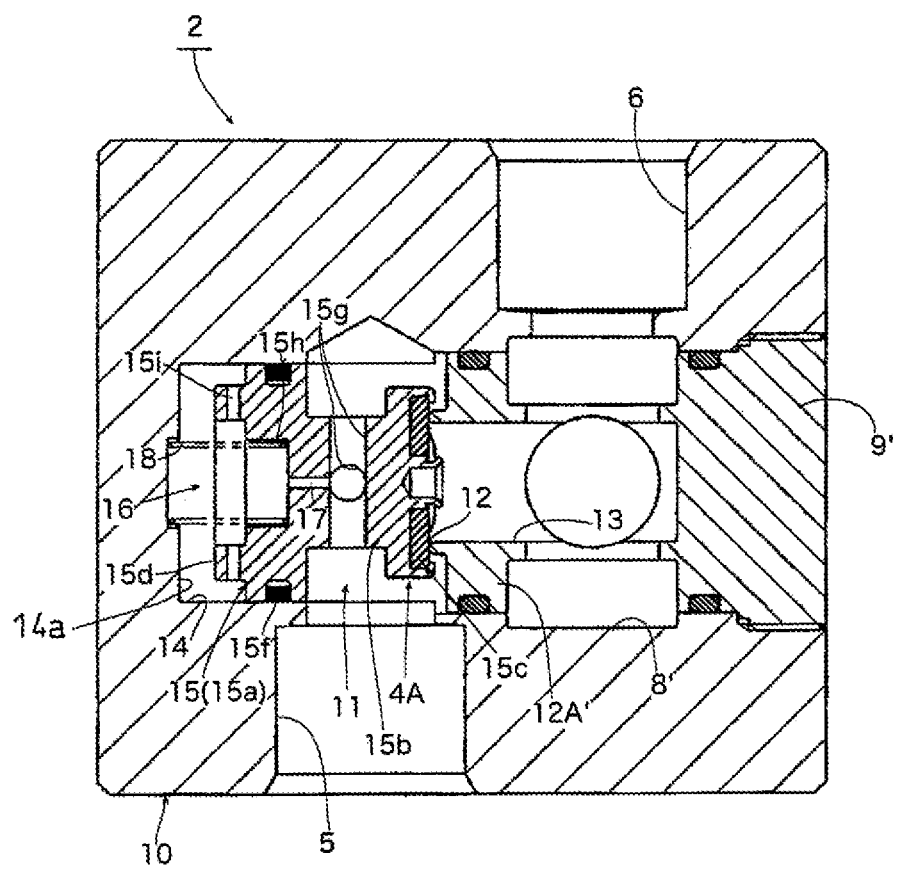
FIG. 6 is a cross sectional view along a line X-X in FIG. 5.
Figure 7:
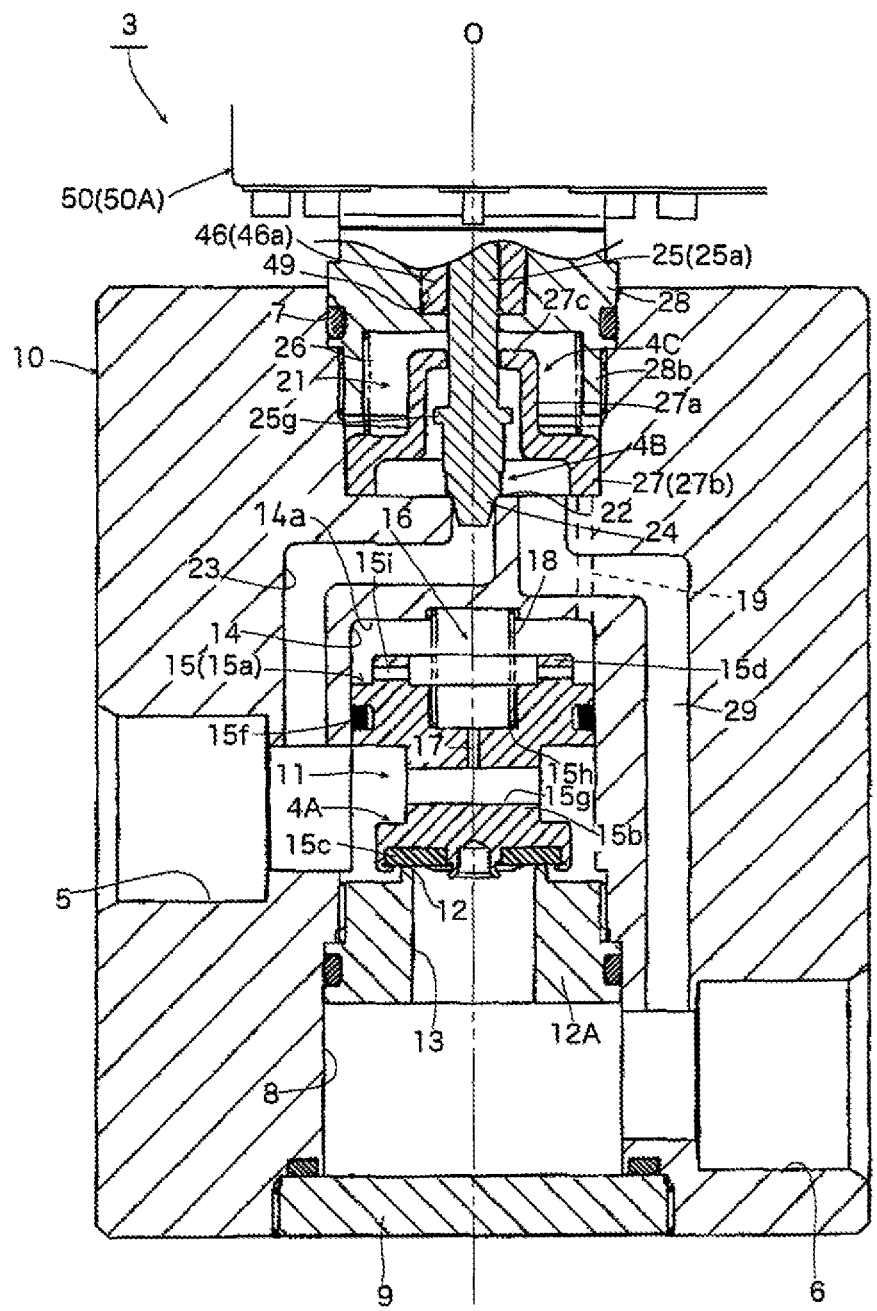
FIG. 7 is a vertical cross sectional view of a substantial part and shows a fully closed state in a third embodiment of the composite valve in accordance with the present invention.

Further, for example, in the first embodiment mentioned above, the first valve body 15 and the second valve body 24 are both arranged in the vertical direction and are separated from each other at the predetermined distance in the transverse direction, however, may be structured, such as a composite valve 2 in accordance with a second embodiment shown in FIG. 5 and FIG. 6, such that the first valve body 15 is arranged transversely and the second valve body 24 is arranged vertically, or may be structured, such as a composite valve 3 in accordance with a third embodiment shown in FIG. 7, such that the valve shaft 25, the second valve body 24 and the first valve body 15 are arranged on the same axis (the rotation axis O of the valve shaft 25).

In this case, in the composite valve 2 in accordance with the second embodiment shown in FIG. 5 and FIG. 6, and the composite valve 3 in accordance with the third embodiment shown in FIG. 7, the same reference numerals are attached to the corresponding portions to the respective portions of the composite valve 1 in accordance with the first embodiment shown in FIG. 1 to FIG. 4. In this case, in the composite valve 2 in accordance with the second embodiment, the downward vertical hole 8 in the composite valve 1 in accordance with the first embodiment comes to a rightward transverse hole 8', and a valve seat member 12A' and a blind lid 9' are integrated.

Further, it goes without saying that the composite valve in accordance with the present invention is not only applied to the heat pump type cooling and heating system, but also may be applied to any intended use of any system.

What is claimed is:

1. A composite valve comprising:
a piston type first valve body;
a valve shaft provided with a needle type second valve body;
an elevation driving means for moving up and down said valve shaft;
a pilot valve body driven so as to be opened and closed by utilizing the elevating motion of said valve shaft; and
a valve main body provided with an inflow port and an outflow port,
wherein between said inflow port and the outflow port in said valve main body, there are provided a fitting and inserting chamber to which said first valve body is slidably fitted and inserted, and which is zoned into a back pressure chamber and a first valve chamber by said first valve body, a first valve port which is open to said first valve chamber, a second valve chamber in which said pilot valve body and the second valve body are arranged so as to be movable up and down, a second valve port which communicates said inflow port or the first valve chamber with said second valve chamber, and a pilot passage which communicates said back pressure chamber with said second valve chamber,
wherein an entirety of the first valve body is accommodated in the fitting and inserting chamber, the fitting and inserting chamber is provided at the upstream side of a valve seat of the first valve body,
wherein pressure in the back pressure chamber is decreased on the basis of the motion of the pilot valve body, thereby the first valve body is moved away from the valve seat to open the first valve port, and
wherein in the case that a lift amount of said second valve body is equal to or less than a predetermined amount, said pilot passage is closed by said pilot valve body, and said first valve port is closed by said first valve body, thereby taking a small flow rate control state in which a flow rate is controlled in correspondence to the lift amount of said second valve body, and in the case that the lift amount of said second valve body goes beyond said predetermined amount, said pilot valve body is moved up in conjunction with the upward movement of said valve shaft so as to open said pilot passage, thereby taking a large flow rate control state in which said first valve body opens said first valve port on the basis of this.

2. A composite valve as claimed in claim 1, wherein an upper side portion of said pilot valve body is slidable to an upper side of said second valve body in said valve shaft, and wherein said pilot valve body is energized downward by a spring member so as to close said pilot passage, and is structured such as to be pulled up against an energizing force of said spring member by a catch portion provided in said valve shaft if the lift amount of said second valve body is further increased from said predetermined amount.

3. A composite valve as claimed in claim 1, wherein said first valve body is provided with a pressure equalizing hole which communicates said first valve chamber with said back pressure chamber.

4. A composite valve as claimed in claim 2, wherein said first valve body is provided with a pressure equalizing hole which communicates said first valve chamber with said back pressure chamber.

5. A composite valve as claimed in claim 1, wherein said first valve body and said second valve body are both arranged in a vertical direction and are separated from each other at a predetermined distance in a transverse direction.

6. A composite valve as claimed in claim 2, wherein said first valve body and said second valve body are both arranged in a vertical direction and are separated from each other at a predetermined distance in a transverse direction.

7. A composite valve as claimed in claim 1, wherein said first valve body is arranged transversally and said second valve body is arranged vertically.

8. A composite valve as claimed in claim 2, wherein said first valve body is arranged transversally and said second valve body is arranged vertically.

9. A composite valve as claimed in claim 1, wherein said valve shaft, said second valve body and said first valve body are arranged on the same axis.

10. A composite valve as claimed in claim 2, wherein said valve shaft, said second valve body and said first valve body are arranged on the same axis.

11. A composite valve as claimed in claim 1, wherein a large diameter of the first valve body is disposed at an upstream side of a first valve control seat.

12. A composite valve as claimed in claim 11, wherein the second valve body is integrally formed with the valve shaft.

13. A composite valve comprising:
a piston type first valve body;
a valve shaft provided with a needle type second valve body;
an elevation driving means for moving up and down said valve shaft;
a pilot valve body driven so as to be opened and closed by utilizing the elevating motion of said valve shaft; and
a valve main body provided with an inflow port and an outflow port,
wherein between said inflow port and the outflow port in said valve main body, there are provided a fitting and inserting chamber to which said first valve body is slidably fitted and inserted, and which is zoned into a back pressure chamber and a first valve chamber by said first valve body, a first valve port which is open to said first valve chamber, a second valve chamber in which said pilot valve body and the second valve body are arranged so as to be movable up and down such that the pilot valve body surrounds the valve shaft so as to be slidable along the valve shaft, a second valve port which communicates said inflow port or the first valve chamber with said second valve chamber, and a pilot passage which communicates said back pressure chamber with said second valve chamber, and wherein in the case that a lift amount of said second valve body is equal to or less than a predetermined amount, said pilot passage is closed by said pilot valve body, and said first valve port is closed by said first valve body, thereby taking a small flow rate control state in which a flow rate is controlled in correspondence to the lift amount of said second valve body, and in the case that the lift amount of said second valve body goes beyond said predetermined amount, said pilot valve body is moved up in conjunction with the upward movement of said valve shaft so as to open said pilot passage, thereby taking a large flow rate control state in which said first valve body opens said first valve port on the basis of this.

* * * * *